United States Patent
Rosene et al.

(10) Patent No.: US 8,347,876 B2
(45) Date of Patent: *__Jan. 8, 2013__

(54) FLOATING TEMPERATURE REGULATING AND EVAPORATION REDUCING COVER FOR A POOL

(76) Inventors: Richard C. Rosene, Murrieta, CA (US); Lora J. Rosene, Murrieta, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/507,918

(22) Filed: Aug. 22, 2006

(65) Prior Publication Data

US 2006/0283443 A1    Dec. 21, 2006

Related U.S. Application Data

(63) Continuation-in-part of application No. 10/875,933, filed on Jun. 24, 2004, now Pat. No. 7,093,593.

(51) Int. Cl.
*F24J 2/42* (2006.01)
*E04H 4/00* (2006.01)

(52) U.S. Cl. ........... 126/565; 126/561; 126/566; 4/498; 4/499

(58) Field of Classification Search .................. 126/624, 126/561–568; 4/503, 498–500; 441/35, 441/40, 41, 129; 405/26, 219, 68–71; D25/2
See application file for complete search history.

(56) References Cited

U.S. PATENT DOCUMENTS

| | | | |
|---|---|---|---|
| 3,072,920 A * | 1/1963 | Yellott | 126/566 |
| 3,683,428 A | 8/1972 | Morris | |
| 3,872,522 A | 3/1975 | Bennett et al. | |
| 3,949,095 A | 4/1976 | Pelehach et al. | |
| 4,022,187 A * | 5/1977 | Roberts | 126/565 |
| 4,033,326 A * | 7/1977 | Leitner | 126/565 |
| 4,109,325 A * | 8/1978 | Shuff | 4/499 |
| 4,146,015 A * | 3/1979 | Acker | 126/565 |
| 4,270,232 A | 6/1981 | Ballew | |
| 4,366,806 A * | 1/1983 | Acker | 126/565 |
| 4,749,606 A * | 6/1988 | Moore | 428/166 |
| 5,216,762 A | 6/1993 | Denny | |
| 5,347,984 A | 9/1994 | Klaren | |
| 5,511,536 A * | 4/1996 | Bussey et al. | 126/565 |
| 5,546,615 A | 8/1996 | Chamness | |
| 5,779,512 A * | 7/1998 | Rupert | 441/123 |
| 6,047,415 A | 4/2000 | Brown | |
| 6,220,908 B1 * | 4/2001 | Peterson | 441/66 |
| 6,571,789 B1 | 6/2003 | Mora | |
| 2001/0047539 A1 * | 12/2001 | Lynn | 4/493 |
| 2004/0064882 A1 * | 4/2004 | Bartlett | 4/502 |
| 2005/0022297 A1 | 2/2005 | Orologio et al. | |

* cited by examiner

*Primary Examiner* — Thomas Denion
*Assistant Examiner* — Daniel Bernstein
(74) *Attorney, Agent, or Firm* — Marc Martino

(57) ABSTRACT

A soft, flexible, floating temperature regulating and evaporation reducing cover for a pool generally comprises an independently inflatable outer ring and central portion. Holes through the central portion permit egress of air from under the central portion when the cover is placed on water. Valves for chamber and cavity are located near one edge such that the cover may be deflated by rolling from an edge opposite the valves. Top and bottom films are adapted to absorb or reflect solar radiation to heat or cool the pool as desired. Magnets on the ring condition water and attach to similar floating covers to form rafts. For holding the cover in a pool during winds, the ring can be inflated with water or in an alternate embodiment, water anchors fill with water.

22 Claims, 2 Drawing Sheets

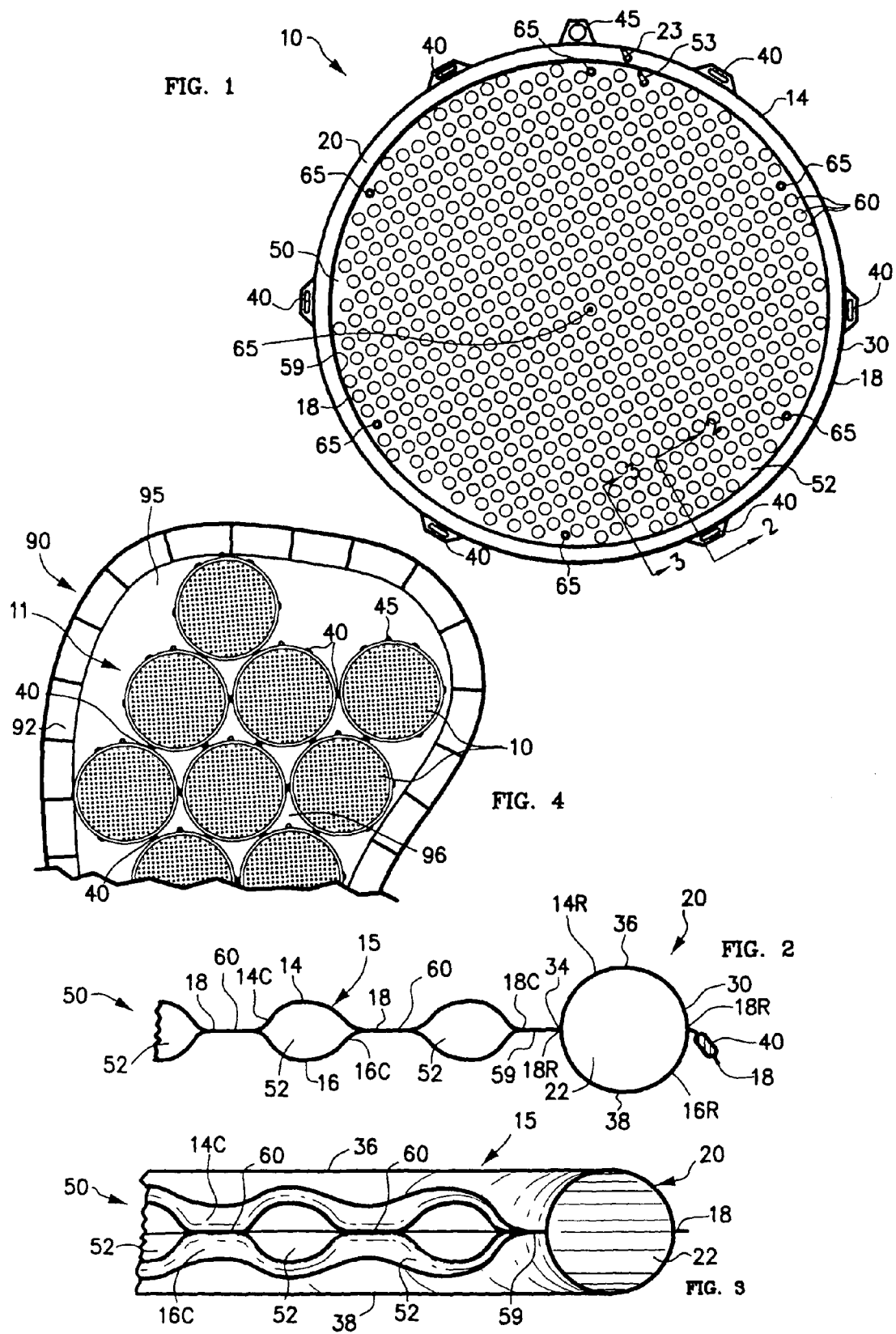

US 8,347,876 B2

FLOATING TEMPERATURE REGULATING AND EVAPORATION REDUCING COVER FOR A POOL

CROSS-REFERENCE TO RELATED APPLICATIONS

This application is a continuation-in-part of application Ser. No. 10/875,933, filed Jun. 24, 2004 now U.S. Pat. No. 7,093,593 incorporated herein in its entirety by reference.

FIELD OF THE INVENTION

This invention relates in general to pool covers, and more specifically involves a floating temperature regulating and evaporation reducing cover for a pool.

BACKGROUND OF THE INVENTION

It is desirable to cover pools, such as swimming pools, for various reasons, such as to prevent evaporation and heat loss and to provide solar heating. Conventional pool covers have several shortcomings. Heavy covers are expensive. They are large and bulky and not easily used or stored. Pool covers of light material, such as of bubble pack type, typically cover an entire pool and project over the decking for anchoring the cover and preventing the cover from falling into the pool. Such covers are subject to winds that often lift them so as to dislocate or actually move the covers from the pool areas to other areas, e.g. a neighbor's yard. Winds can pull such large light pool covers from under the sand bags or steel pipes that are commonly used. Further, any large cover can be dangerous for small children or animals, which can be trapped underneath.

Smaller solar pool heaters of the floating type have been proposed, but none appear to be available for purchase. The ones proposed have several disadvantages. Many heaters have hard or rigid parts that are dangerous should a person fall into the pool and that make covers bulky and difficult to store. Some of the larger floating covers have large air chambers that would encourage convection and heat loss. The lighter ones would tend to fly away in the wind. In general, they are bulky to store, difficult to deploy, and difficult to retrieve and remove.

Therefore, there it is desirable to have an improved floating pool cover that overcomes shortcomings in the prior art.

Magnets and magnetic fields have been used to treat water. Examples of magnetic treatment covers for water are disclosed in U.S. Pat. Nos. 3,951,807 and 4,153,559, both in the name of Charles H. Sanderson, and U.S. Pat. No. 5,059,296 to Mark Sherman. The magnetic devices are said to condition the water by altering various minerals suspended in the water and to reduce the amount of oxidizer, such as chlorine, required to keep the water sanitary Therefore, it is further desirable that the improved floating pool cover incorporate magnets for conditioning the water.

There are also instances when it is desirable to prevent solar energy from heating a pool. For example, in hot climes, it is often desirable to prevent pools, such as irrigation and animal drinking ponds, from heating and evaporating. Conventionally, to save the water, such pools may be covered with a canopy, completely enclosed, or cooled by a refrigerator. Such amelioration methods are typically very costly or very inconvenient.

Therefore, there has been a need for an improved floating pool cover for reducing unwanted solar heating of pools.

SUMMARY OF THE INVENTION

The invention is a soft, flexible, pool temperature regulating and evaporation reducing cover for floating on water. It generally comprises an inflatable outer ring and an inflatable central portion. The ring defines a chamber for holding fluid, such as air or water. The central portion is disposed centrally the ring and includes a periphery connected to the ring, and an upper film and a lower film joined together to define a cavity for inflation with air. When chamber and cavity are inflated, the cavity is between the top and bottom planes of the ring. The ring chamber and the cavity are independently inflatable such that the ring can be filled with water for holding the cover in a pool in windy weather.

Holes through the central portion permit egress of air from under the central portion when the cover is placed on water such that the lower film rests substantially on the surface of the water.

Valves for chamber and cavity are located near one edge of the cover such that the cover may be deflated by rolling from an edge opposite the valves.

Magnets on the ring condition water and attach to similar floating covers to form rafts.

The features and advantages of the invention will be readily understood when the detailed description thereof is read in conjunction with the drawings, wherein like reference numerals refer to like parts throughout.

BRIEF DESCRIPTION OF THE DRAWINGS

FIG. 1 is a top plan view of a preferred embodiment of the floating pool cover of the invention.

FIG. 2 is an enlarged cross section taken on line 2-2 of FIG. 1.

FIG. 3 is an enlarged sectional view taken on line 3-3 of FIG. 1.

FIG. 4 is a top plan view of a plurality of floating pool covers of FIG. 1 in use in a swimming pool.

DETAILED DESCRIPTION OF THE INVENTION

Figure 5:
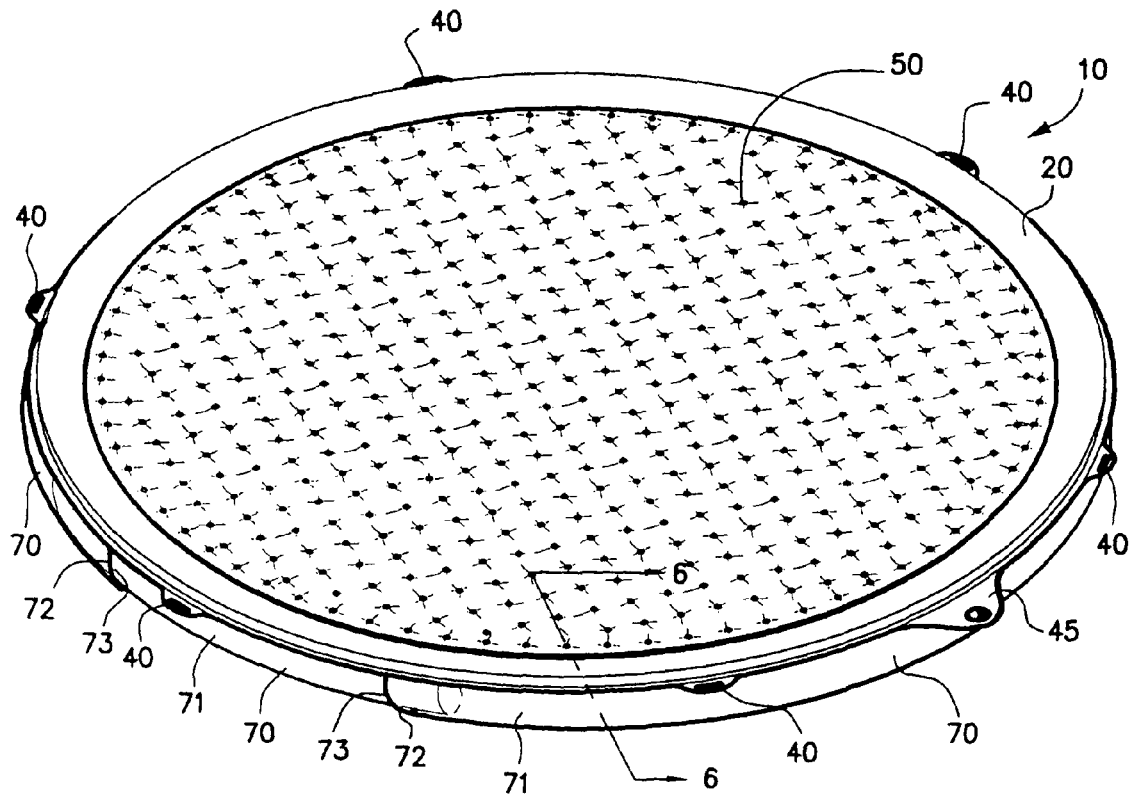
FIG. 5 is a top perspective view of an alternate embodiment of the floating pool cover of the invention including water anchors.

With reference now to the drawings, FIG. 1 is a top plan view of a preferred embodiment of the floating pool cover 10 of the invention, FIG. 2 is an enlarged cross section taken on line 2-2 of FIG. 1, FIG. 3 is an enlarged sectional view taken on line 3-3 of FIG. 1, and FIG. 4 is a top plan view of a plurality of floating pool covers 10 of FIG. 1 in use floating on water 95 in a swimming pool 90.

Cover 10 is soft and flexible so as to prevent no hazard should a person fall onto cover 10 either in pool 90 or outside of pool 90. Cover 10 generally comprises an outer ring 20 and central portion 50. A preferred embodiment of cover 10 is primarily constructed of upper film 14, such as upper film 14R of ring 20 and upper film 14C of central portion 50, and lower film 16, such as lower film 16R of ring 20 and lower film 16C of central portion 50. The film may be of thin plastic, such as of vinyl, bonded, such as by radio frequency bonding, at bonds 18 so as to form the general structure.

Outer ring 20 includes upper film 14R and lower film 16R bonded at bonds 18R to define a chamber 22 that is inflatable or turgesible with a fluid, such as a gas, such as air, or a liquid, such as water, such as pool water, through a valve, such as valve 23. Valve 23 may be any conventional valve, such as a bore and a stopper, which can control ingress and egress of fluid to and from chamber 22. Outer ring 20 includes a radially outward side 30, a radially inward side 34, a top 36, and a bottom 38. Top 36 and bottom 38 of ring 20 generally define spaced parallel planes.

Central portion 50 is disposed centrally of outer ring 20 and includes an upper film 14C and a lower film 16C joined, such as around periphery 59 of central portion 50, to upper film 14C to define a cavity 52 therebetween for holding a gas. Cavity 52 has an area in top view. Periphery 59 of central portion 50 is connected to ring 20, such as to radially inward side 34. Inflation and deflation means, such as valve 53, controls ingress and egress of gas, such as air, to and from cavity 52. When cavity 52 is inflated with air, cover 10 will float on water 95. Preferably, central portion 50 contains a single inflatable cavity 52 to facilitate inflation and deflation.

Connection means, such as plurality of spot welds 60, connect upper film 14C and lower film 16C central of periphery 59 such that upper film 14C and lower film 16C of cavity 52 are held in proximity and preferably held, as seen in FIG. 3, between the planes defined by the top 36 and bottom 38 of ring 20, when chamber 22 and cavity 52 are inflated with air and cover 10 is placed on a flat surface. This ensures: that cover 10 lies properly on water 95; that films 14C, 16C are held in close proximity for superior solar heating properties; and that heaters 10 are stackable when inflated. Close spacing of films 14C, 16C decreases heat loss from convection. Many other connection means, such as webbing or weld lines, are possible. However, welds allow the use of just two films and spot welds 60 provide the most area for cavity 52 while still holding films 14C, 16C in close proximity. Spot welds 60 are disposed in a grid so as to shape upper film 14C into an array of convex surfaces; a convex surface being located between each four welds 60. Each convex surface acts as a lens for intensifying the solar heating effect on lower film 16C. Chamber 22 and cavity 52 are inflatable and deflatable independently of each other.

Central portion 50 includes air escape means, such as a plurality of passages, such as through-holes 65 near periphery 59 and in the center of central portion 50, for allowing air to escape from below central portion 50 when cover 10 is deployed on water 95 and for allowing water on the top of central portion 50, such as from rain or from a decorative water fall, to drain. Holes 65 may be evenly spaced, such as every sixty degrees around the circumference of cover 10. Upon deployment, entrapped air under central portion 50 substantially escapes upward through holes 65 such that the center of central portion 50 sags slightly and central portion 50 is substantially in contact with water 95. Because of the flexibility of cover 10, at proper inflation, cover 10 will conform to waves in pool 90 so as to keep new air from entering under central portion 50.

Magnetic means, such as a plurality of spaced magnets 40, are connected to radially outward side 30 of ring 20, for conditioning water 95 and for releasably joining to magnetic means of other covers 10 to join a plurality of covers 10 to form a raft 11, as seen in FIG. 4. Magnets 40 may be uniformly spaced, such as every sixty degrees. When cover 10 is floating, magnet 40 is in contact with water 95 and produces a magnetic field in water 95 for conditioning water 95. Magnets 40 may be bonded between upper and lower film 14, 16. Magnets 40 of floating covers 10 tend to attach themselves to magnets 40 of other similar floating covers 10 to form rafts 11. Rafts 11 facilitate removal of covers 10 from pool 90, because when one cover 10 near pool side 92 is grasped, the other covers 10 in its raft 11 will also be pulled to pool side 92 as the grasped cover 10 is pulled out. Floating covers 10 in a raft 11 are easily separated by a person in pool 90 such that a person falling into pool 95 is not trapped under raft 11. Covers 10 may help float a person who accidentally falls into pool 90.

Cover 10 includes hanging means, such as hanger 45 attached to radially outward side 30 of ring 20, for hanging cover 10, such as on a peg on a wall, during storage. Hanger 45 may be constructed of bonded upper and lower film 14, 16 having a bore therethrough.

As described above, chamber 22 of outer ring 20 and cavity 52 of central portion 50 can be made from just two films, upper film 14 and lower film 16 welded together. Vinyl is the preferred film, but other films could be used.

In a first embodiment, cover 10 is adapted to be a solar heater. In this heating embodiment, upper film 14 has high transmissivity of sunlight so light easily enters chamber 22 and cavity 52. Upper film 14 may be clear plastic, such as 0.006" thick vinyl. Preferably, lower film 16 has high absorptivity of sunlight and is stronger, for puncture resistance. Lower film 16 may be 0.008" thick vinyl of dark color, such as blue. Preferably, films 14, 16 are resistant to breakdown from ultraviolet light.

Upper film 14 may be modified in manners known in the art which cause it to reflect downwardly much of the infrared energy impinging on its underside, thereby contributing to a "greenhouse" effect. Such reflectivity may be achieved by the use of films and coatings which provide unidirectional reflectivity. These films and coatings are well known in the art and are commonly applied to the windows of buildings to deter the entry of solar energy without preventing outward visibility. Mechanical, physical, molecular or chemical modifications of the film may also provide the appropriate reflectivity.

Lower film 16 is preferably opaque, absorptive of solar energy and of relatively high thermal conductivity. Lower film 16 may be provided with a material which will enhance its capability of absorbing solar energy to produce heat. Absorption-enhancing materials are well known and include carbon black, aluminum, copper and metal oxides. Lower film 16 may be modified so that the heat generated by the incident solar energy will be transmitted readily through the thickness. A liquid, powder or film may be laminated to the surface of lower film 16, and/or metallic particles may be added to lower film 16 to increase its thermal conductivity. Coatings and mixtures of powdered metals and metal oxides, as well as threads, filaments, filings and compounds placed on and/or located within lower film 16 may improve its thermal conductivity. Preferably, lower film 16 has a density for light absorption of about fifty percent such that about fifty percent of the light energy heats the surface and about fifty percent passes through for deep water heating. This can be varied for specific use.

In a second embodiment, cover 10 is adapted for reducing temperature increase of the pool water 95 by reducing the amount of solar energy reaching water 95 and by insulating water 95 from high ambient air temperatures. This cooling configuration is similar to the heating configuration described above except as noted. In this cooling configuration, preferably, the upper surface 15 of upper film 14 is highly reflective of solar radiation, so little or no solar light or heat easily enters chamber 22 and cavity 52. Such reflectivity may be achieved by the use of films and coatings. These films and coatings are well known in the art and are commonly applied to the windows of buildings to deter the entry of solar energy. Upper film 14 may be light colored plastic, such as 0.006" thick white vinyl or other thermoplastic. Alternately, upper film 14 may be "metallized", such as with aluminum, silver, titanium, metal oxides or other metal particles, or may be coated with a thin reflective layer, as is well known in the art, so as to face and reflect solar radiation.

Preferably, lower film 16 has low absorptivity of solar heating and has low heat conductivity such that lower film 16 remains as cool as possible. In this manner, lower film 16 passes most solar heating radiation on to the deep water. Since rate of water evaporation from a pool is largely a function of water surface temperature, it is better to heat the entire pool a little, than to heat the surface a lot. Lower film 16 may be 0.008" thick transparent or translucent vinyl.

In this matter, cover 10 reflects solar heat. The air contained in cavity 52 and chamber 22 insulate water 95 from the ambient air and upper film 14. The general impermeability of cover 10 prevents evaporation from the water surface that it covers. The above features also inhibit algae growth by furnishing a cool dark environment.

It should be appreciated that a single embodiment of cover 10 can be used for both heating and cooling applications by turning the cover 10 over, that is by selecting either top 36 or bottom 38 for contact with the surface of water 95. There would likely be some loss of efficiency using this method over using specialized embodiments.

A typical outside diameter for cover 10 is sixty inches, although other diameters could be used to better accommodate pools of various size and shape. The small amount of open water 96 between covers 10 is desirable as a small amount of direct sunlight is necessary to prevent growth of undesirable alga such as mustard algae.

To prevent cover 10 from blowing away in high wind, outer ring 20 may be filled with water 95, or may be at least partially filled depending on the wind conditions, using valve 23. The weight of the water 95 in outer ring 20 holds cover 10 within pool 90.

Figure 6:
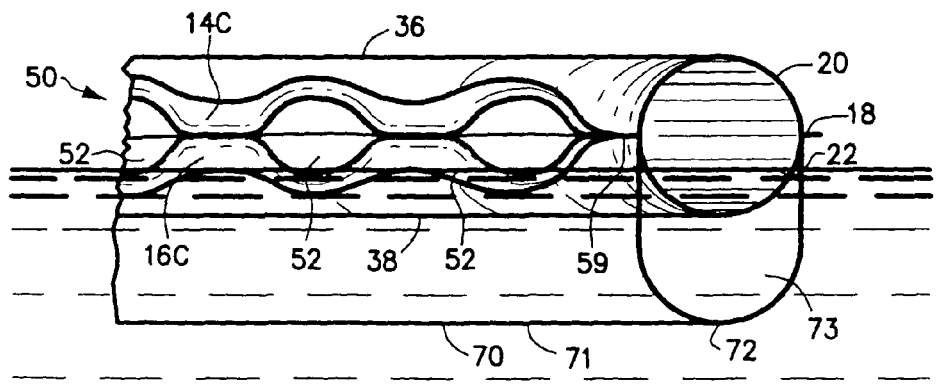
FIG. 6 is an enlarged sectional view taken on line 6-6 of FIG. 5.

Alternatively, water anchoring means may be used, to anchor cover 10 to the water surface and prevent it from blowing away in high wind. FIG. 5 is a top perspective view of an alternate embodiment of the floating pool cover 10 of the invention including water anchoring means, such as a plurality of water anchors 70. FIG. 6 is an enlarged sectional view taken on line 6-6 of FIG. 5.

Each water anchor 70 comprises a cylindrical section 71 attached to the underside, such as to bottom 38 of outer ring 20, of cover 10. Anchors 70 include means, such as partially open ends 72 of cylindrical section 71 having an opening 73, to permit ingress of water. Instead of open ends 73, side perforations or other means may be used for ingress of water. The water serves as a weight to anchor floating cover 10 to the water surface during wind gusts. In the exemplary embodiment, a plurality of anchors 70 is disbursed under outer ring 20. The end 72 of one anchor 70 may be inserted into the opening 73 of an adjoining anchor 70 to close down the effective size of opening 73. Cover 10 with anchors 70 can be lifted from water 95 with a strong steady lifting force, permitting water 95 in anchors 70 to drain.

For temporary storage of covers 10 during use of pool 90, covers 10 may be stacked or may be hung by hangers 45. For long term storage and shipping, covers 10 may be deflated by expelling air and water 95 from chamber 22 and cavity 52 out valves 23, 53 respectively. Cover 10 is specifically designed for deflation by rolling from the edge opposite valves 23, 53.

From the foregoing description, it is seen that the present invention provides an extremely simple, efficient, reliable, and passive floating solar pool cover which heats the pool during sunlight and reduces heat loss at other times.

Although a particular embodiment of the invention has been illustrated and described, various changes may be made in the form, composition, construction, and arrangement of the parts herein without sacrificing any of its advantages. For example, although cover 10 is shown as circular in top view, it could have other shapes. Therefore, it is to be understood that all matter herein is to be interpreted as illustrative and not in any limiting sense, and it is intended to cover in the appended claims such modifications as come within the true spirit and scope of the invention.

We claim:

1. A soft, flexible, temperature regulating and evaporation reducing solar heater for floating on liquid comprising:
    an inflatable outer ring defining a chamber for holding gas; said ring including:
        a radially outward side;
        a radially inward side;
        a top; and
        a bottom;
    an inflatable central portion disposed centrally said ring including:
        an upper film; and
        a lower film joined to said upper film to define a cavity therebetween for holding gas;
        a periphery connected to said ring; said cavity when inflated with gas for floating said solar heater on liquid such that said solar heater floats on the liquid; and
    anchoring means on the bottom of said solar heater for immersion in the liquid for ingress of the liquid for anchoring said solar heater against lifting by wind; wherein: said anchoring means comprises a plurality of elongate tubular sections, each said tubular section attached to said outer ring and including open ends; said open ends of adjacent tubular sections overlapping such that said open end of one said tubular section is inside the adjacent said tubular section.

2. The solar heater of claim 1, said chamber and said cavity being independently inflatable.

3. A floating solar pool cover, comprising:
    an inflatable outer ring defining a chamber for holding a fluid or a gas, the inflatable outer ring comprising a first valve for controlling ingress and egress of the fluid or the gas within the chamber, a radially outward side, a radially inward side, a top, and a bottom;
    an inflatable central portion disposed centrally within the inflatable outer ring, the inflatable central portion comprising an upper film, a lower film joined to the upper film defining a cavity therebetween for holding a second gas, a periphery connected to the inflatable outer ring along the radially inward side, and a second valve for controlling ingress and egress of the second gas within the cavity; and
    at least one water anchor comprising an elongated tubular section attached between and along the radially outward and inward side of the inflatable outer ring and disposed along the bottom of the inflatable outer ring.

4. The floating solar pool cover of claim 3, wherein the at least one water anchor comprises open ends.

5. The floating solar pool cover of claim 3, wherein the at least one water anchor comprises a plurality of water anchors.

6. The floating solar pool cover of claim 3, wherein the inflatable outer ring, inflatable central portion and at least one water anchor comprises a flexible film.

7. The floating solar pool cover of claim 3, including a plurality of through-holes disposed along the inflatable central portion.

8. The floating solar pool cover of claim 3, wherein the chamber and cavity are independently inflatable.

9. An inflatable solar pool cover, comprising:
an upper film;
a lower film selectively bonded to the upper film;
a first bond disposed between the upper and lower film along a radially outward side;
a second bond disposed between the upper and lower film along a radially inward side;
an inflatable outer ring defining a chamber formed between the first and second bonds;
a first valve disposed along the inflatable outer ring for controlling ingress and egress of a fluid or a gas;
an inflatable central portion defining a cavity formed within the second bond;
a second valve disposed along the inflatable central portion for controlling ingress and egress of a second gas; and
a water anchor comprising a third film forming an elongated tubular section attached between and along the radially outward and inward sides of the inflatable outer ring.

10. The inflatable solar pool cover of claim 9, wherein the water anchor comprises at least one aperture for ingress and egress of water.

11. The inflatable solar pool cover of claim 9, wherein the water anchor comprises open ends for ingress and egress of water.

12. The inflatable solar pool cover of claim 9, wherein the water anchor comprises a plurality of water anchors.

13. The inflatable solar pool cover of claim 9, wherein the upper film, lower film and third film comprise flexible films.

14. The inflatable solar pool cover of claim 9, wherein the chamber and cavity are independently inflatable.

15. The inflatable solar pool cover of claim 9, wherein the upper and lower films form both the chamber and the cavity.

16. The inflatable solar pool cover of claim 9, including a plurality of through-holes disposed along the inflatable central portion.

17. A pool cover, comprising:
an inflatable outer ring comprising a chamber and a first valve for controlling ingress and egress of a fluid or a gas to the chamber, the inflatable outer ring defined as comprising an outside and inside circumference;
an inflatable central portion disposed centrally within the inflatable outer ring attached to the inside circumference of the inflatable outer ring, the inflatable central portion comprising a cavity and a second valve for controlling ingress and egress of a second gas to the cavity; and
a flexible film attached between and to the outside and inside circumference of the inflatable outer ring defining an elongated tubular water anchor formed between the inflatable outer ring and the flexible film.

18. The pool cover of claim 17, wherein the elongated tubular water anchor comprises open ends for ingress and egress of water.

19. The pool cover of claim 17, wherein the elongated tubular water anchor comprises a plurality of apertures for ingress and egress of water.

20. The pool cover of claim 17, wherein the inflatable outer ring and inflatable central portion comprise a flexible material.

21. The pool cover of claim 17, wherein the chamber and cavity are independently inflatable.

22. The pool cover of claim 17, wherein the flexible film comprises a plurality of flexible films forming a plurality of elongated tubular water anchors.

* * * * *